H. W. Neal.
Wheel Plow.

No. 93,549. Patented Aug. 10, 1869.

Witnesses.
John A. Ellis
H. L. North

Inventor
H. W. Neal
Per
J. H. Alexander
Atty

United States Patent Office.

H. W. NEAL, OF SIDNEY, OHIO, ASSIGNOR TO JASON McVAY, OF SAME PLACE.

*Letters Patent No. 93,549, dated August 10, 1869.*

IMPROVEMENT IN PLOWS.

The Schedule referred to in these Letters Patent and making part of the same.

*To all whom it may concern:*

Be it known that I, H. W. NEAL, of Sidney, in the county of Shelby, and State of Ohio, have invented certain new and useful Improvements in Plows; and I do hereby declare that the following is a full, clear, and exact description thereof, reference being had to the accompanying drawings, and to the letters of reference marked thereon, which form a part of this specification, and in which—

Figure 1:
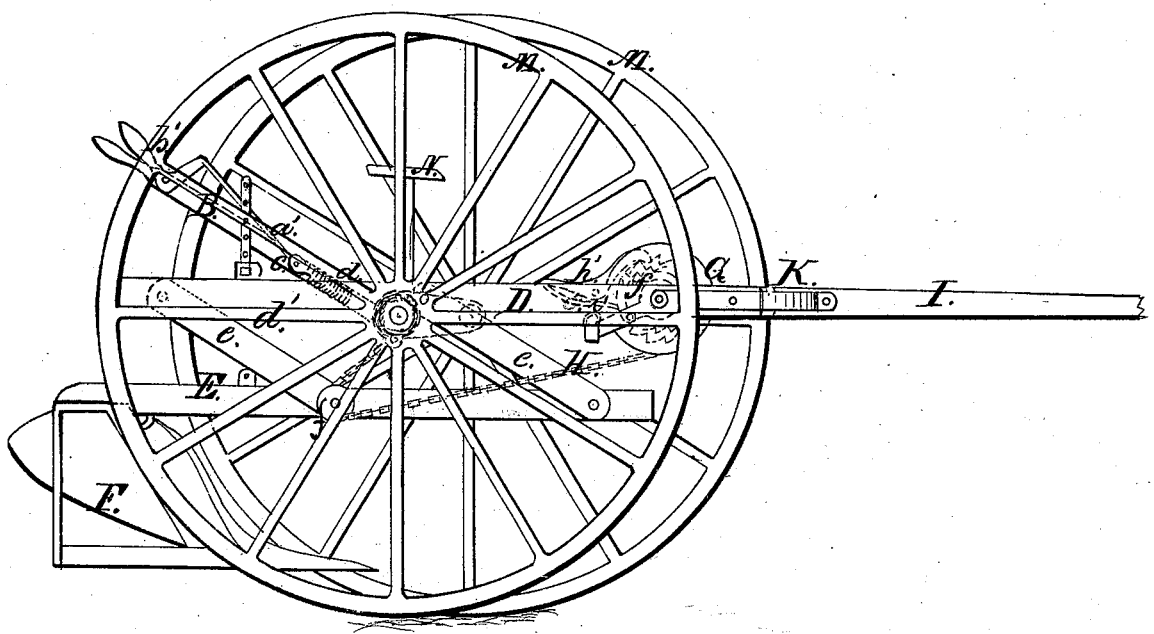
Figure 2:
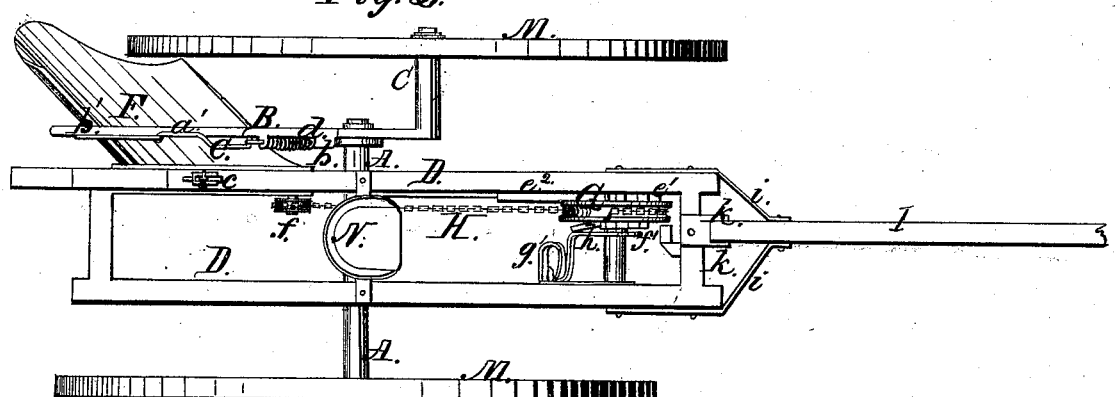

Figure 1 represents a side elevation, and
Figure 2, a plan view of my plow.
Similar letters indicate like parts in both figures.

The nature of my invention consists in the employment of a cast-iron arm attached to the supplementary axle, provided with plunger working up and down, and fitting into a cog-wheel attached to the end of the axle.

My invention consists, further, in the employment of boxings and set-screws to secure the axle to the frame, whereby the plow may be changed to cut a wide or narrow furrow.

It also consists in the employment of a rotary lever, with chain and pulley attached, to raise or lower the plow-beam, so that the plow may be adjusted to cut deep or shallow furrows, in combination with such other devices, the peculiarity of which will hereinafter be fully set forth.

To enable others skilled in the art to which my invention appertains, to make and use the same, I will now describe its construction and operation.

In the accompanying drawings—

A represents the axle, to one end of which is attached the arm B, provided with the supplementary axle C.

$a$ is an oval flange, formed with teeth on its upper surface, and secured to the end of the axle inside the arm B.

The arm B is made with a mortised projection, $b$, on its inner lower side, into which is inserted the plunger $c$, said plunger being provided with a spiral spring, $d$, and its upper end attached to one end of the rod $a'$, the other end of the rod $a'$ being attached to the hand-lever $b'$, made as seen in fig. 1, and pivoted at its vertex to inner side of the upper end of the arm B.

By this arrangement, the supplementary axle may be raised or lowered at the pleasure of the operator.

D represents the frame secured to the axle A.

$c'$ is a mortise, formed in one side of the frame.

Through this mortise is the adjustable bar $d'$, the lower end of said bar being pivoted to the upper surface of the plow-beam E.

The plow-beam E is provided at its rear end with the plow F, and is attached to the clevises $e\ e$.

On the inner side of plow-beam is attached the pulley $f$, the object of which will be hereinafter described.

G represents a pulley, to each side of which is attached a ratchet-wheel, $e^1\ f'$. This device is then pivoted in the forward part of the frame A, as seen in fig. 2.

$g'$ represents a foot-lever, made as seen in fig. 2, and pivoted on the shaft of pulley G.

$h$ is a pawl pivoted to the foot-lever $g'$, and working into the ratchet-wheel $f'$.

$h'$ is also a foot-lever, made to act as a pawl at one end, which works into the ratchet-wheel $e^1$.

The lever $h'$ is pivoted to the inner side of the frame, and operates in connection with spring $i'$.

H is a chain, one end of which is attached to the axle A and passing over the pulley $f$, secured to the plow-beam, and then over the pulley G, the other end of the chain being attached to the rear part of said pulley. By operating the foot-lever $g'$ and the foot-lever $h'$, which acts as a stop, the plow may be raised or lowered at pleasure.

I represents the tongue, pivoted in metal projections $i\ i$, formed on the forward end of the frame.

K is a metal plate, made as seen in fig. 2. In this plate is passed the end of the tongue, by which it is given any pitch desired.

M M represent the wheels, and
N, the driver's seat.

Having thus described my invention,
What I claim as new, and desire to secure by Letters Patent, is—

1. In combination with the swinging beam E, lever $h'$, operating substantially as and for the purpose specified.

2. The foot-lever $g'$, pulley G, chain H, and swinging beam E, all combined to operate substantially as and for the purpose specified.

3. The combination of foot-lever $h'$ with pivoted pawl $h$ thereto, ratchet-wheels $e'\ f'$, pulley G, and pawl $e^2$, substantially as and for the purpose set forth.

In testimony that I claim the foregoing as my own, I affix my signature, in presence of two witnesses.

H. W. NEAL.

Witnesses:
GILBERT HARMON,
R. E. RICHARDS.